INVENTOR.
Burt A. Peterson
BY
ATTORNEYS

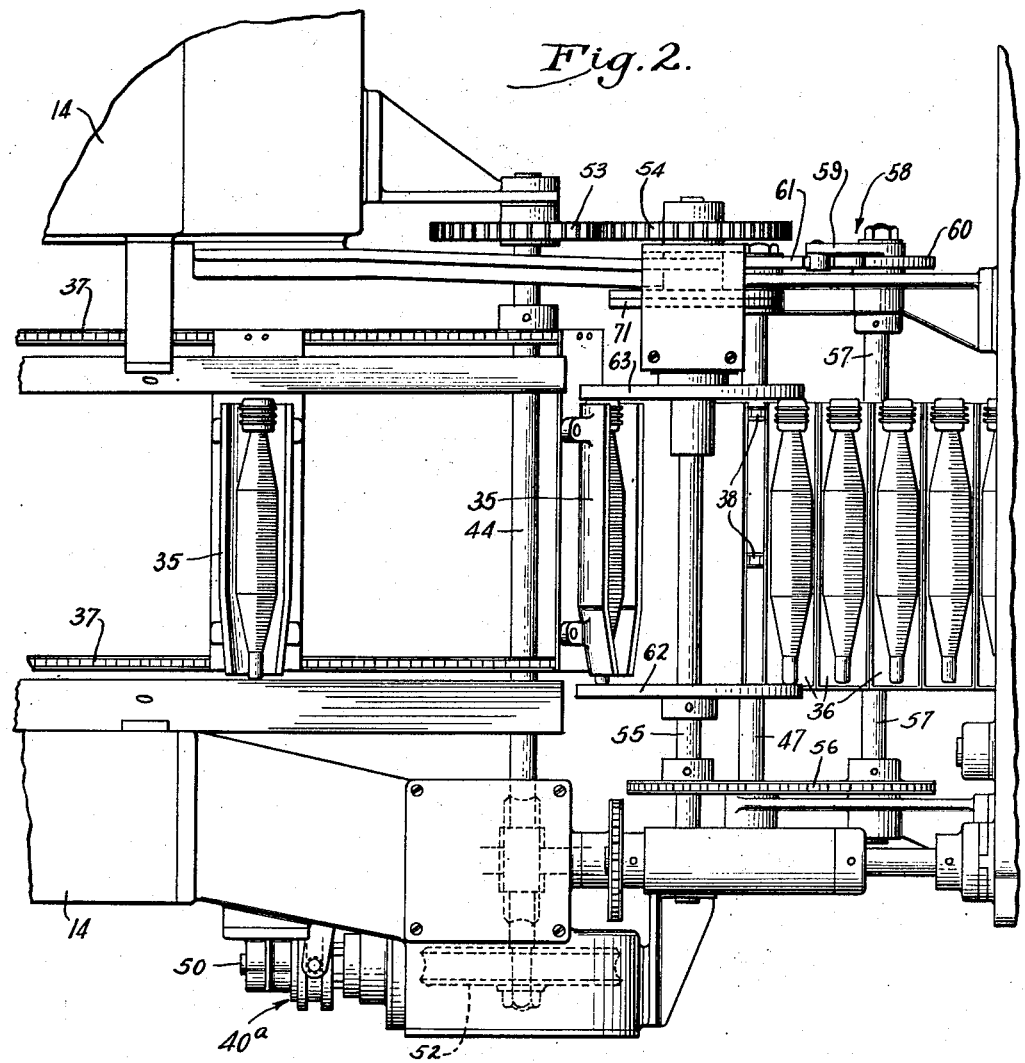

Dec. 14, 1954  B. A. PETERSON  2,696,901
BOBBIN TRANSFER MECHANISM
Filed June 22, 1950  3 Sheets-Sheet 3
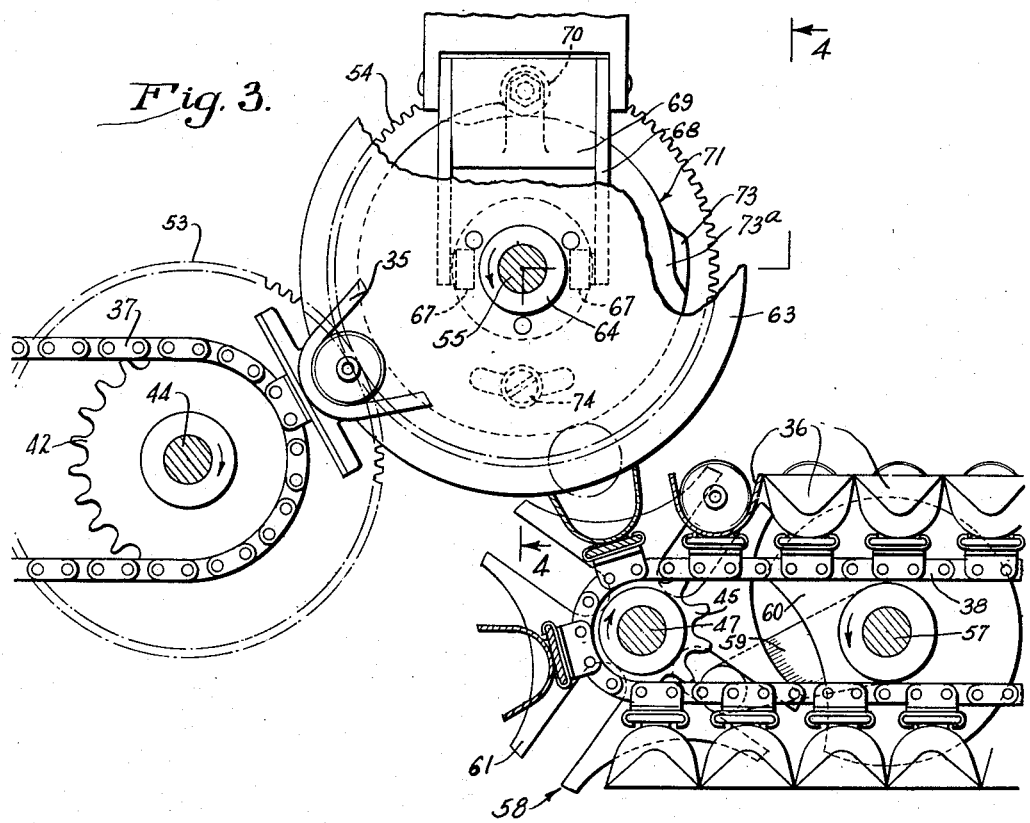
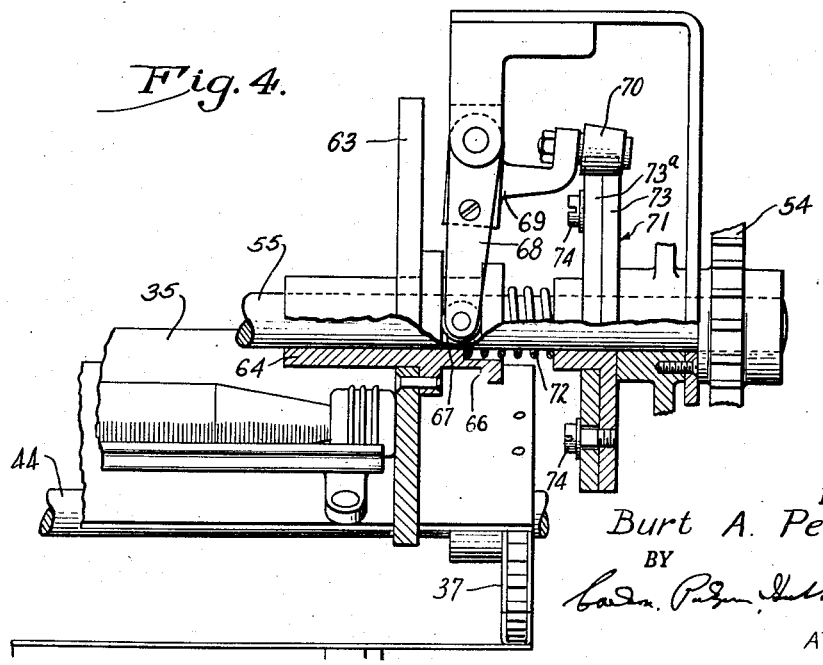
INVENTOR.
Burt A. Peterson
BY
ATTORNEYS

United States Patent Office 2,696,901
Patented Dec. 14, 1954

2,696,901

BOBBIN TRANSFER MECHANISM

Burt A. Peterson, Rockford, Ill., assignor to Barber-Colman Company, Rockford, Ill., a corporation of Illinois Application June 22, 1950, Serial No. 169,636

10 Claims. (Cl. 198—25)

The invention pertains to high speed bobbin winding machines of the type comprising a plurality of equidistantly spaced winding units, a receiving conveyor having receptacles into which the wound bobbins are deposited upon completion of each winding cycle with the bobbins spaced apart according to the spacing of the several units, and a second or "condensing" conveyor equipped with receptacles having a differently spaced relation and to which the wound bobbins on the receiving conveyor are transferred preliminary to the ultimate delivery of the wound bobbins to pinboards or other carriers. A machine of this type is disclosed in my copending application, Serial No. 595,971, filed May 26, 1945, now Patent No. 2,543,931, the present invention constituting an improvement upon the means for effecting the transfer of the bobbins from the first or receiving conveyor to the second or condensing conveyor.

The primary object of the invention is to insure a more positive and certain control of the wound bobbins during their transfer from one conveyor to the other.

A further object is to provide a transfer mechanism between the two conveyors including a carrier with a gripping device operative automatically to receive and successively clamp the bobbins successively presented thereto at a predetermined point in the travel of the receiving conveyor, then to advance the same in the direction of movement of the condensing conveyor, and finally deliver them to receptacles on the condensing conveyor.

The objects of the invention thus generally set forth, together with other and ancillary advantages are attained by the construction and arrangement shown by way of illustration in the accompanying drawings, in which:

Fig. 2 is a fragmentary top elevational view of the transfer mechanism and associated conveyors.

Fig. 3 is a fragmentary side elevational view on a larger scale of the transfer mechanism, the condensing conveyor being shown partly in longitudinal section.

Fig. 4 is a fragmentary sectional view taken approximately in the plane of line 4—4 of Fig. 3.

Figure 1:
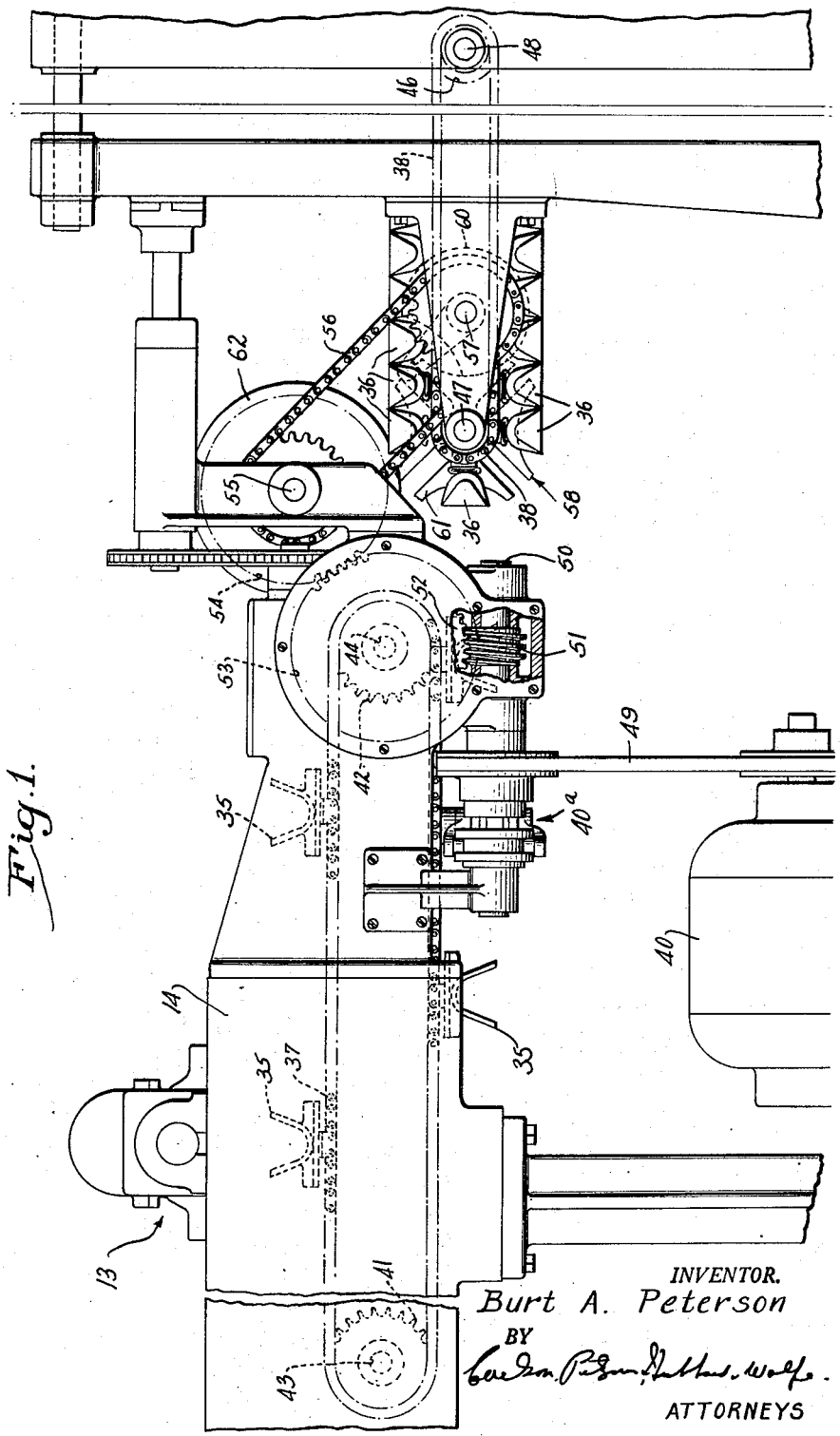
Figure 1 is a fragmentary front elevational view of the improved mechanism interposed between the two associated conveyors.

The improved bobbin handling mechanism is especially adapted for use in a multiple unit winding machine of the type disclosed and claimed in Marcellus Patent No. 2,409,639, issued October 22, 1946. The machine as shown generally in Fig. 1, comprises briefly a plurality of winding units 13 arranged in uniformly spaced relation upon a suitable horizontally elongated framework 14.

The bobbin handling mechanism forming the subject of this invention is common to all of the winding units of the machine and is arranged for operation concurrently with each winding cycle to effect the disposal of bobbins wound in the preceding cycle of the machine. Upon the completion of each winding cycle, the wound bobbins released from the several winding units are deposited in a series of receptacles or bobbin holders in the form of pockets 35 spaced apart according to the spacing of the winding units and forming a part of the first or receiving conveyor, and are then transferred to a second series of receptacles in the form of troughs 36 on a second or condensing conveyor, the troughs 36 being spaced apart according to the spacing of the pins on pin boards to which the bobbins are ultimately delivered as set forth in my said copending application Serial No. 595,971.

The receiving and condensing conveyors are disposed horizontally in generally end-to-end relation with the receiving conveyor disposed beneath the winding units, the adjacent ends of the two conveyors being spaced a short distance apart to accommodate the transfer mechanism of the present invention. As shown, the receiving conveyor has two spaced parallel chains 37 carrying spaced pockets 35 and operating over sprockets 41 and 42 on shafts 43 and 44, and the condensing conveyor likewise has two chains 38 running over sprockets 45 and 46, respectively mounted on shafts 47 and 48. The receiving conveyor is arranged to be driven continuously by a motor 40 in the operation of transferring wound bobbins to the condensing conveyor, while the latter is driven with a step-by-step movement from the receiving conveyor.

The drive of the receiving conveyor by the motor is under the control of a clutch 40a actuated in the operation of the winder in proper timed relation thereto but forming per se no part of the present invention. As shown, the sprocket shaft 44 of the receiving conveyor has a belt and pulley connection 49 with the motor, the pulley being connected with the driven member of the clutch and mounted upon a stub shaft 50 having a worm 51 meshing with a worm wheel 52 fast on the sprocket shaft 44. As seen in Fig. 2 the worm wheel is fast on the forward end of the sprocket shaft 44 of the receiving conveyor and the rear end of this shaft has a driving connection with the sprocket shaft 47 of the condensing conveyor for driving the same with a step by step motion.

In the present instance the sprocket shaft 44 of the receiving conveyor has a spur gear 53 on its rear end (Fig. 2) meshing with a gear 54 on a parallel shaft 55, and this shaft in turn has a chain and sprocket connection 56 with the drive shaft 57 of a Geneva stop motion 58 the driven member of which is mounted on the sprocket shaft 47 of the condensing conveyor. As best seen in Figs. 2 and 3 the Geneva stop motion comprises a driver 59 and a locking disk 60 fast on the shaft 57, and a driven member 61 coacting with the driver and the locking disk in the well-known manner.

In accordance with the present invention, mechanism is provided for seizing the wound bobbins as they pass a predetermined point adjacent the end of the receiving conveyor, advancing them to the condensing conveyor which, as above indicated, is spaced a short distance from the receiving conveyor, and finally releasing and depositing the bobbins into the troughs 36 onto the condensing conveyor. This mechanism preferably comprises a rotary carrier including a pair of disks 62 and 63 (Fig. 2) mounted on the shaft 55 for relative axial motion under cam control. The disk 62 is fast on the shaft and the disk 63 slidable thereon. As seen in Fig. 4, the disk 63 is mounted on a sleeve 64 keyed on the shaft and having a groove 66 for the reception of rollers 67 on laterally spaced arms 68 of a shifter lever 69. The latter carries a roller follower 70 coacting with a cam 71 on the shaft 55 to shift the disk 63 rearwardly against the action of a coiled spring 72. The cam may be made in the form of two disks 73 and 73a one of which is fast on the shaft and the other adjustably connected with the first through the medium of a clamping screw 74. This construction permits of easy adjustment of the cam for timing purposes.

In the transferring operation the clamping disks 62 and 63 of the carrier rotate at a speed corresponding to the speed of the receiving conveyor, and as a bobbin moves into delivery position at the end of the conveyor the cam 71 operates upon the shifter lever 69 releasing the disk 63 to the action of the spring 72, forcing the disk against the butt end of the bobbin, as shown in Fig. 4, the other end bearing against the disk 62. The clamping action occurs during rotation of the disks which move at the same speed as the bobbin pockets 35, the bobbins being removed from the pockets while the latter occupy laterally opening positions.

The gripping control cam is, of course, timed with respect to the drive of the condensing conveyor so that as a trough on this conveyor moves upwardly into upright position the bobbin is released into a pocket immediately underlying the same. Preferably the latter is stationary while receiving the released bobbin. Following such release, the cam shifts the disk 63 rearwardly against the action of the spring and holds the same in such position for the reception of the next bobbin.

It will be observed that the operation of transferring bobbins from the receiving conveyor to the condensing conveyor is accomplished by simple and effectual means, including a single gripping device operative to grip the bobbins successively presented thereto in the travel of the receiving conveyor and to deliver the same in rapid succession to the condensing conveyor. In particular it will be observed that the length of the arcuate path through which the bobbins are moved by the carrier is less than the spacing of the receptacles 35 on the receiving conveyor so that ample time is allowed within which to grip, transport, and release the successive bobbins.

It will also be seen that in the transfer of the bobbins from the receiving conveyor to the transfer mechanism or carrier the bobbins are gripped adjacent the peripheral edge of the clamping disks so mounted with respect to the receiving conveyor that the arcuate path of movement of the bobbins while held by the disks intersects the arcuate path of travel of the bobbins at spaced points defining a gripping zone, and that relative approaching and separating movements are imparted to the disks while passing through this zone. Finally, by the arrangement set forth the separating movement of the disks to position them for the reception of a bobbin on a conveyor is utilized to release simultaneously a previously gripped bobbin at a point removed from the conveyor herein in position to be received by a receptacle of the condensing conveyor.

I claim as my invention:

1. A bobbin winding machine having a conveyor with equidistantly spaced receptacles thereon for transporting wound bobbins to a predetermined delivery position successively, a second conveyor driven in timed relation to the first conveyor and also having receptacles thereon for receiving and transporting bobbins from a predetermined receiving position, and a transfer mechanism between the two conveyors including a rotary carrier having a single pair of clamping members operative to grip the bobbins as they move into said delivery position and to release the same as they move into said receiving position, said clamping members operating to move successively presented bobbins through an arcuate path of a length less than the spacing of the receptacles on the first conveyor.

2. A bobbin winding machine having a conveyor with equidistantly spaced receptacles thereon for transporting wound bobbins to a predetermined delivery position successively, a second conveyor driven in timed relation to the first conveyor and also having receptacles thereon for receiving and transporting bobbins from a predetermined receiving position, and a transfer mechanism between the two conveyors including a rotary carrier having a single pair of circular clamping members for gripping bobbins in radially offset relation to the axis of the carrier, and means operative in the rotation of the members to clamp a bobbin in the delivery position of the first conveyor and to release it in the receiving position of the second conveyor, said clamping members being operative to move the bobbins through an arcuate path of the length less than the spacing of the receptacles of the first conveyor.

3. A bobbin winding machine having a conveyor with receptacles thereon for transporting wound bobbins to a predetermined delivery position successively, a second conveyor driven in timed relation to the first conveyor and also having receptacles thereon for receiving and transporting bobbins from a predetermined receiving position, and a transfer mechanism between the two conveyors including a rotary carrier comprising a single pair of clamping disks and means including a cam operative in rotation of said disks to shift them relative to each other to clamp and release successively bobbins interposed between the peripheral edge portions of the disks.

4. A bobbin winding machine having a conveyor with receptacles thereon for transporting wound bobbins to a predetermined delivery position successively, a second conveyor driven in timed relation to the first conveyor and also having receptacles thereon for receiving and transporting bobbins from a predetermined receiving position, and a transfer mechanism between the two conveyors including a rotary carrier comprising a shaft having a driving connection with one of said conveyors, a single pair of disks mounted for relative axial movement on the shaft but held against rotation relative thereto, spring means tending to effect a relative approaching movement of the disks to clamp bobbins successively moved into position between the disks by the first conveyor, and cam means for separating the disks to release the bobbins.

5. A bobbin winding machine having a conveyor with receptacles thereon for transporting wound bobbins to a delivery position successively, means for driving said conveyor with a continuous motion, a second conveyor with receptacles thereon, having a driving connection with the first conveyor operative to advance the second conveyor with a step-by-step motion to carry its receptacles successively into a receiving position, and a rotary carrier having a driving connection with the first conveyor and comprising a single pair of relatively shiftable clamping disks operative in their movement through said delivery position to engage the bobbin adjacent the peripheral edge portions of the disks and to release the same as they move into said receiving position.

6. A bobbin winding machine having, in combination, a conveyor for supporting a plurality of bobbins in equidistantly spaced relation and operative to move said bobbins successively through an arcuate path, a carrier for transporting bobbins from the conveyor to a discharge position spaced therefrom comprising a pair of members having bobbin gripping portions spaced apart axially of the bobbins on said conveyor and movable in a path intersecting said arcuate path of movement of the bobbins at spaced points therein so as to define a gripping zone, means driving the carrier in timed relation to the conveyor, and means operative to effect successively relative approaching and separating movements between the gripping portions thereof during the passage of a bobbin relative to said gripping zone, said gripping portions being positioned in the separating movement thereof for the reception of a bobbin therebetween and for the simultaneous release at said discharge position of a previously gripped bobbin.

7. A bobbin winding machine having, in combination, a conveyor for supporting a plurality of bobbins in equidistantly spaced relation and operative to move said bobbins successively through an arcuate path, a rotary carrier for transporting bobbins from the conveyor to a discharge position spaced therefrom comprising a pair of disks spaced apart axially of the bobbins on said conveyor and having peripheral bobbin gripping portions movable in a second arcuate path intersecting said arcuate path of movement of the bobbins at spaced points therein so as to define a gripping zone, means driving the carrier in timed relation to the conveyor, and means operative to effect successively relative approaching and separating movements between said disks during the passage of a bobbin relative to said gripping zone, said disks being positioned in the separating movement for the reception of a bobbin between said peripheral gripping portions and for the simultaneous release at said discharge position of a previously gripped bobbin.

8. A carrier for transporting articles from a receiving position to a discharge position spaced from the receiving position comprising, in combination, a pair of members having gripping portions arranged in opposed spaced relation and mounted for movement in a predetermined path through said receiving and discharge portions successively, means for delivering articles to the carrier at said receiving position, drive means for the carrier, and means operative in timed relation to the movement of the carrier by said drive means to effect relative approaching and separating movements in quick succession between said gripping portions in the movement of the carrier through said receiving position, said gripping portions being operative as an incident to the separation thereof for the reception of an article in the receiving position to simultaneously release an article previously gripped in the receiving position.

9. A bobbin winding machine as defined in claim 7 in which said first arcuate path curves downwardly between said disks and said second path curves outwardly in a generally horizontal direction away from the area of its intersection with the first arcuate path.

10. A bobbin winding machine as defined in claim 7 in which the bobbins are held on the first conveyor in troughs with the bobbin ends projecting from the trough ends and said disks straddle said troughs and bobbins as the latter traverse a downwardly curved part of said first arcuate path.

References Cited in the file of this patent
UNITED STATES PATENTS

| Number    | Name     | Date          |
|-----------|----------|---------------|
| 531,616   | Black    | Dec. 25, 1894 |
| 1,581,200 | Guenther | Apr. 20, 1926 |
| 1,887,211 | Mortimer | Nov. 8, 1932  |